United States Patent Office 3,118,859
Patented Jan. 21, 1964

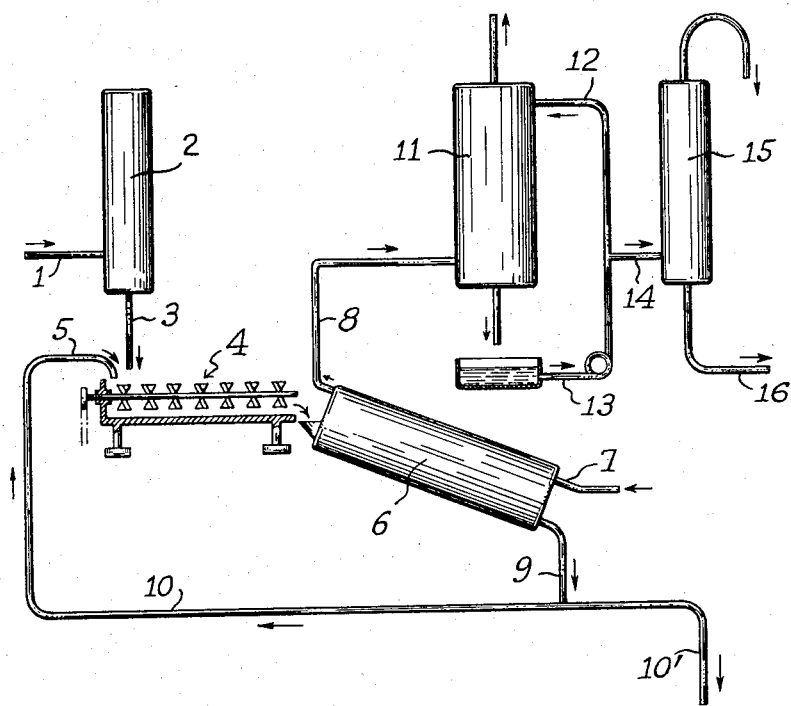

3,118,859
PROCESS FOR THE MANUFACTURE OF
FORMALDEHYDE POLYMERS
Marcel Delassus, Mazingarbe, and Pierre Vasseur, Vermelles, France, assignors to Houilleres du Bassin du Nord et du Pas-de-Calais, a French public establishment
Filed Dec. 21, 1960, Ser. No. 77,431
Claims priority, application France Mar. 16, 1960
4 Claims. (Cl. 260—67)

This invention relates to a process for the manufacture of formaldehyde polymers.

It is known that the formaldehyde polymers known as polyoxymethylene glycols, or more simply polyoxymethylenes, can be obtained by various processes which are basically of two types: namely, precipitation and evaporation.

In the first case, the polymerization of a larger or smaller fraction of the formaldehyde initially present in a concentrated aqueous solution of formaldehyde is effected, generally by modification of the pH of the solution. The polymer is precipitated in a form which is more or less easy to separate depending on the conditions under which the polymerization has been carried out. In order that the polymer should be filterable, the polymerization has to be carried out very slowly, which necessitates the use of apparatus which is extensive in relation to its production capacity, and the conversion of the formaldehyde initially present into a polymer remains very incomplete. The precipitate has to be drained, freed of the mother liquors containing formaldehyde with which it is impregnated, and dried. The mother liquors, which contain a substantial proportion of the formaldehyde initially present, have to be treated in order to concentrate them prior to re-cycling and this treatment may require a further adjustment of the pH.

In the second case, again starting with concentrated aqueous solutions of formaldehyde which have been brought to a suitable pH, evaporation of the water in the solution is carried out under reduced pressure, leaving the dry polymer as a residue. This operation is carried out discontinuously and the speed of evaporation is limited by that of the polymerization, otherwise excessive amounts of formaldehyde are entrained in the distillate, and even despite this precaution some of it is always thus entrained. This process avoids the difficulties of filtration and the rate of conversion of the formaldehyde into a solid polymer is very high, but the productivity of the apparatus remains low and the use of reduced pressure renders continuous operation practically impossible.

Neither of these processes is suitable for the large-scale production of formaldehyde polymers.

It is also possible to carry out the concentration of an aqueous solution by distillation under pressure or under vacuum until it has a concentration of 70% by weight of formaldehyde, such a solution solidifying quickly with the formation of polymer when brought to a temperature of the order of 20° C., and it would be readily possible to obtain a considerable continuous production of formaldehyde polymers by this method. The polymers thus obtained are, however, of a low "order," that is to say they consist of chains each of which only comprises a small number of $CH_2O$ groups. They form a compact mass, of a pasty consistency, the handling and above all the drying, which is indispensable in order to obtain a $CH_2O$ content of the order of 99%, of which are particularly expensive and difficult.

We have now found that formaldehyde polymers can be produced in a form particularly suitable for their subsequent handling and drying, by polymerizing an aqueous solution of formaldehyde in the presence of a quantity of solid formaldehyde polymer which is at least equal to the quantity of formaldehyde present in the solution. The presence of the added polymer which is itself of a high order during the polymerization encourages the topochemical reactions which lead to the formation of polymers of a high order and of a powdery nature which are easy to dry and handle. In addition the presence of the added polymer greatly accelerates the polymerization of the formaldehyde. Furthermore, this process is readily applicable to continuous production.

According to the present invention, therefore, there is provided a process for the production of solid formaldehyde polymers by the polymerization of formaldehyde present in an aqueous solution, in which the polymerization is carried out in the presence of a quantity of added formaldehyde polymer which is at least equal to the quantity of formaldehyde present in the solution.

If this process is to be carried out continuously, a part of the polymer produced is recycled to fresh formaldehyde solution to constitute the polymer added thereto. Preferably the polymerization is carried out at a temperature of from 20° C. to 40° C.

In a preferred method of carrying out the invention, the formaldehyde solution is mixed with the formaldehyde polymer to form a non-pasty mixture having a water content of less than 30% by weight, mixing of the mixture is continued until polymerization of the formaldehyde is substantially complete, and the mixture is dried to give a granular formaldehyde polymer having a $CH_2O$ content of at least 99%.

Apparatus suitable for carrying out the process according to the invention, and operation of the process in such apparatus, will now be described, by way of example only, with reference to the single figure of the accompanying drawing which is a diagrammatic representation, partly in section, of such apparatus.

The initial formaldehyde solution to be polymerized, which may be of any concentration, but is preferably as concentrated as possible, is introduced through a supply conduit 1 into a distillation column 2. Advantageously the initial solution consists of the crude product obtained from an installation producing formaldehyde by oxidation-dehydrogenation on a silver catalyst or the like, the ratio $CH_2O/H_2O$ being very favorable in this case; moreover such an installation itself necessarily comprises a distillation column which may be suitable for the operation as described here. Any aqueous solution of formaldehyde may, however, be used. The distillation column 2 is operated to produce a solution containing about 70% by weight of $CH_2O$ and 30% of $H_2O$ which is discharged through the outlet 3.

Such a solution is unstable and must be kept hot; it is therefore passed immediately from the outlet 3 to a mixer 4 of the paddle type, screw type or the like, into which is introduced, at the same time, through a pipe 5, a weight of dry polymer equal to that in the 70% solution and the mixture of dry polymer and solution is continuously passed through the mixer. The addition of dry polymer in this case represents about 140% of the weight of formaldehyde introduced in the form of solution.

The addition of already formed polymer to the formaldehyde solution has a double object; firstly, to accelerate the polymerization of the formaldehyde which, due to the addition, is completed in a few minutes and, secondly, to reduce the water content of the resulting mixture to such an extent as to obtain, at the outlet from the mixer 4, not a paste, but a moist powder which is easy to handle, and in addition, as already stated, to encourage the production of polyoxymethylene of a high order.

The moist product leaving the mixer is conveyed into a drier 6 through which a current of air is passed, the air being introduced through an inlet 7 at a temperature of the order of 40°, and leaving through an outlet 8 with a moisture content lower than 1%. Some of the dried product leaving through an outlet 9 is returned to the mixer through a pipe 10 leading to the pipe 5, while the greater part is collected at 10'.

Since the vapor pressure of the polymer is by no means negligible, the air passed through the drier 6 entrains a small portion of formaldehyde in gaseous form; the air is therefore passed by the pipe 8 to a washer 11 in which it is washed with a dilute solution of cooled formaldehyde which is circulated through pipes 12 and 13.

Some of the solution in circulation, corresponding to the quantity of formaldehyde retained by the washer, is passed through a pipe 14 to a distillation column 15 where it is re-concentrated to be returned either to the concentration column 2 or preferably through a pipe 16 to an installation producing formalin where it is used as make-up water thus reducing the total quantity of water to be evaporated.

The product obtained at 10' consists of polyoxymethylenes of the formula $HO(CH_2O)_nH$ in which $n$ is greater than 100, in the form of a granular powder containing 99% or more by weight of $CH_2O$.

In order that the invention may be more fully understood, the following example is given by way of illustration only:

*Example*

The production of polyoxymethylene was carried out in apparatus as illustrated in the accompanying drawing. A solution containing 70% by weight of $CH_2O$ and 30% of water was passed at the rate of 1 metric ton per hour from the column 2 into the mixer 4 into which was simultaneously introduced polymer having a water content of 1% from the drier 6 at the rate of 1 metric ton per hour.

The mixer was so dimensioned that the materials were discharged from it about 5 minutes after introduction; the mixer also comprised a device which maintained the temperature of the mixture discharged from the mixer at about 40° C.

A moist powder containing 15.5% water was discharged from the mixer at the rate of 2 metric tons per hour and was passed to the drier through which a current of air at 40° C. was passed. The air current entrained 3% of the formaldehyde used, namely 50.7 kg./hour.

About 1656 kg./hour of polymer containing 1% of water were discharged from the dried, of which 1000 kg./hour were recycled to the mixer and 656 kg./hour, or 92.8% of the formaldehyde introduced in the solution, constituted the net production.

344 kg./hour of solution containing 14.7% by weight of formaldehyde were extracted from the washer circuit and passed to the distillation column 15 where the concentration was brought to 24% before the solution was passed to an installation producing formalin.

The foregoing description of a specific process is given by way of example only, and it should be understood that the concentration of the solution to be polymerized may be higher or lower than 70% by weight of $CH_2O$ and that the ratio of added polymer/formaldehyde in solution may differ from that of 1.45 in the above example, provided that the moisture content of the product leaving the mixer remains lower than 30%.

The method of pre-concentrating the solution to be polymerized and the method of recovering gaseous formaldehyde do not form essential characteristics of the present invention and may be modified if desired.

What we claim is:

1. A process for the production of a high order formaldehyde polymer of the general formula $HO(CH_2O)_nH$ wherein $n$ is greater than 100, said process comprising mixing a concentrated aqueous solution of formaldehyde with a dry, solid, high order formaldehyde polymer, of the general formula $HO(CH_2O)_nH$ in which $n$ is an integer greater than 100, the quantity of added polymer being at least equal to 100% by weight of formaldehyde present in the solution, to form a moist powder mixture having a water content of less than 30% by weight, continuing mixing of the mixture at a temperature of from about 20° to about 40° C., until polymerization of the formaldehyde is substantially complete, and drying the mixture to form a granular formaldehyde polymer having a $CH_2O$ content of at least 99%.

2. A process according to claim 1 wherein the formaldehyde solution has a formaldehyde content of about 70% by weight.

3. A process according to claim 1 wherein the amount of solid polymer is about 140% of the weight of the formaldehyde present in the solution.

4. A continuous process for the production of a high order formaldehyde polymer of the general formula $HO(CH_2O)_nH$ wherein $n$ is greater than 100, said process comprising mixing a concentrated aqueous solution of formaldehyde with a dry and solid high order formaldehyde polymer of the general formula $HO(CH_2O)_nH$ in which $n$ is an integer greater than 100, the quantity of added polymer being at least equal to 100% by weight of formaldehyde present in the solution, to form a moist powder mixture having a water content of less than 30% by weight, continuing mixing the mixture at a temperature of from about 20° to about 40° C. until polymerization of the formaldehyde is substantially complete, drying the mixture to form a granular formaldehyde polymer having a $CH_2O$ content of at least 99% and recycling a part of the polymer so produced to a fresh formaldehyde solution.

References Cited in the file of this patent

UNITED STATES PATENTS 2,593,862　　Eickmeyer _____ Apr. 22, 1952